United States Patent

[11] 3,579,926

[72] Inventor Anthony Mario Gaspari
  Montreal, Quebec, Canada
[21] Appl. No. 749,722
[22] Filed Aug. 2, 1968
[45] Patented May 25, 1971
[73] Assignee Pall (Canada) Ltd.
  Montreal, Quebec, Canada

[54] SANDBLASTING STENCIL AND METHOD OF MAKING SAME
9 Claims, 7 Drawing Figs.

[52] U.S. Cl. ................................. 51/262,
  51/311
[51] Int. Cl. ................................ B24b 55/00
[50] Field of Search ........................ 51/262,
  262.1, 310, 311, 312

[56] References Cited
UNITED STATES PATENTS

| | | | |
|---|---|---|---|
| 2,162,332 | 1939 | Frick | 51/262 |
| 2,270,945 | 1942 | Frick | 51/262 |
| 2,393,668 | 1946 | Wartha | 51/262 |
| 3,295,263 | 1967 | Savoca et al. | 51/262 |
| 3,328,925 | 1967 | Hewitt | 51/312 |

Primary Examiner—William R. Armstrong
Attorney—Janes & Aeschlimann

ABSTRACT: This invention provides a method for precutting sandblasting stencil by cutting with a die a two-ply stencil comprising a soft, elastomeric masking sheet of material resistant to erosion by sandblasting, having on one face a layer of adhesive which is removably bonded to a harder, flexible nonelastomeric plastic backing sheet, so as to cut out the stencil pattern through the masking sheet without cutting through the backing sheet. The second face of the masking sheet is then covered with an adherent sandblast-erodable retaining sheet to form a three-ply die-cut stencil sheet. For use in sandblasting, the backing sheet is stripped off, exposing the adhesive layer on the masking sheet, which is thereby bonded to a stone surface after the cutout portions are removed. This invention also provides the three-ply die-cut stencil sheet comprising sandblasting-erosion-resistant masking sheet, an adhesive layer bonded to a backing sheet on one surface of the masking sheet and an adherent retaining sheet bonded to the second face of the masking sheet.

PATENTED MAY 25 1971　　3,579,926
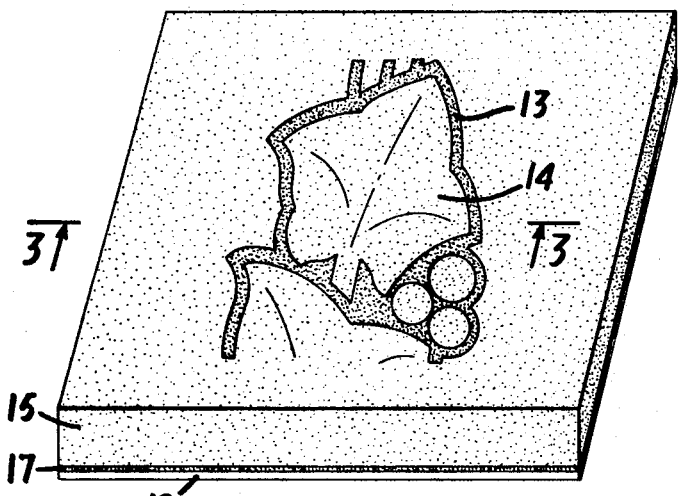
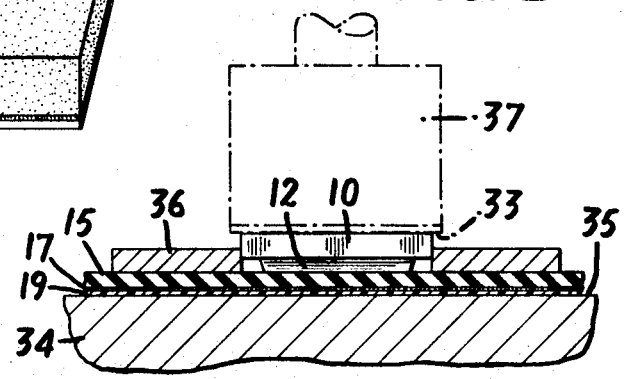
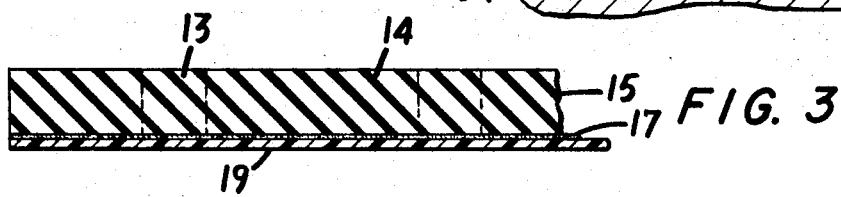
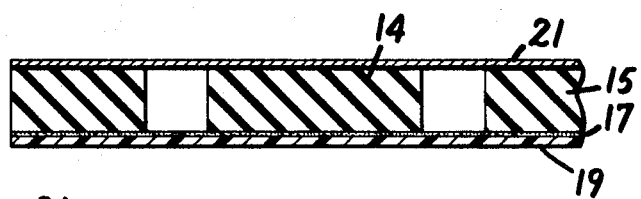
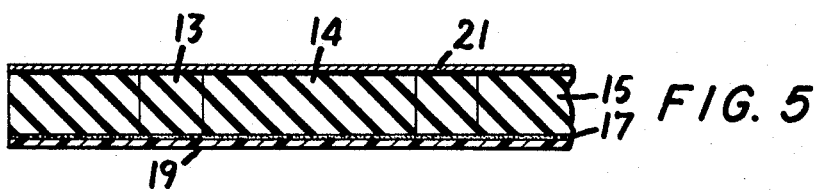
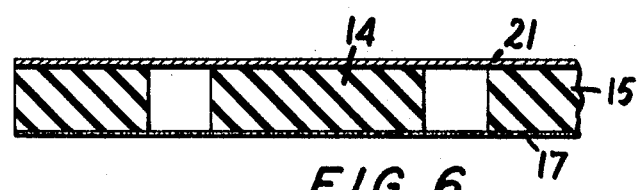
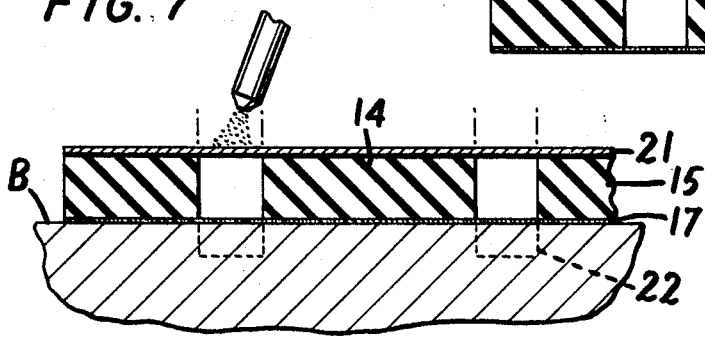

SANDBLASTING STENCIL AND METHOD OF MAKING SAME

This invention relates to masking stencils used for sandblasting inscriptions or designs onto stone or other hard surfaces, such as concrete or brick. More particularly, this invention relates to a stencil, to the method of preparing the stencil which can be used as a precut stencil and also can be directly cut on the surface to be sandblasted, and to the use of the stencil for sandblasting inscriptions or designs onto the hard surfaces.

The usual method of cutting letters and designs into stone or other such hard surfaces is by sandblasting through a stencil. The stencil is formed of a resilient material, such as partially cured rubber, which cannot be penetrated by the sandblasting particles. The pattern in the stencil may be precut, or it may be cut out after the stencil material has been applied to the stone.

One type of precut stencil, as described in U.S. Pat. No. 3,295,263, comprises a sheet of soft rubber stencil material sandwiched between two polyvinyl alcohol, polyethylene or polyvinyl chloride plastic sheets, each cemented to the rubber by a layer of adhesive. The stencil is formed by cutting a two-ply stencil, formed of rubber and one sheet, with a die which does not cut the plastic sheet. The second plastic sheet is then placed on top. When the stencil is to be applied to a stone surface, the bottom plastic sheet is removed, exposing the adhesive layer; so that when the stencil is applied to the stone, the rubber stencil material adheres to the stone. The remaining layer of plastic must then be removed before sandblasting is carried out through the cutout portions of the stencil.

The stencil described in this patent has the disadvantage that both plastic sheets have to be removed before sandblasting, risking the possibility of displacing some of the cutout portions of the stencil when removing the second sheet.

A second kind of stencil is shown in Canadian Pat. No. 757,807 issued May 7, 1967, and comprises a stencil material such as a rubber sheet, a layer of adhesive, a clear plastic sheet, a layer of adhesive, and finally a backing of some sort. The stencil design is cutout of the stencil using molded dies by cutting through the rubber stencil sheet, but not cutting through the clear plastic sheet. After the stencil has been cut, the paper backing is removed, exposing the adhesive, and the entire sheet is then applied to the stone. The plastic backing is a film that can be eroded or blasted away by the sandblasting operation.

The above-described type of stencil sheet cannot be used for shape carving. In shape carving, after the central part of a design, e.g. a leaf, is formed in the stone by sandblasting through the stencil with a narrow nozzle, using tiny steel shot which forms, in the hands of a master craftsman, a three-dimensional surface on the stone resembling that of a real leaf, the portions of the stencil which had been cutout are then replaced over the shape-carved portions of the stone and narrow outline portions surrounding the shape-carved area are removed and the outline surrounding the shape-carved design is then sandblasted from the rock so as to more boldly define the design. The type of stencil having a clear plastic backing cannot be fitted over the design on the stone because the plastic backing by its nature is far less resilient than the rubber sheet and does not stretch to accommodate the generally uneven surface of the shape-carved surface.

The sandblasting stencil prepared according to the present invention should be precut to form the stencil pattern. The cut portion can be removed and replaced for shape carving, if desired.

The invention utilizes a two-ply stencil blank for use in inscribing designs into hard surfaces by sandblasting, comprising a soft elastomeric masking sheet ply of material resistant to erosion by sandblasting but which can be readily cut by a stenciling die, and a harder, flexible, nonelastomeric plastic backing sheet ply adhered to the adhesive and formed of a material which is resistant to being cut by a stencil die. One surface of the erosion-resistant masking sheet remains uncovered.

The method of the invention for preparing a sandblasting stencil for cutting designs into hard surfaces, comprises cutting a stencil pattern with a die through a ply of material resistant to erosion by sandblasting, said erosion-resistant ply having one uncovered face and on the second face thereof a layer of adhesive and a hard plastic backing sheet, resistant to being cut by the die, attached to said adhesive layer; and applying to the uncovered second face of the erosion-resistant ply an adherent sandblast-erodable retaining sheet to form a three-ply die-cut stencil sheet. The backing sheet can subsequently be removed to expose the surface of the erosion-resistant material covered with an adhesive layer, and the remaining two plies can then be applied and bonded by the adhesive layer, to the hard surface to be cut.

This invention also includes the three-ply die-cut stencil sheet described above comprising the erosion-resistant die-cut ply, an adhesive layer applied to a first face of the die-cut ply, a backing sheet attached to the adhesive layer, and a retaining sheet adhered to the second face of the die-cut ply, the retaining sheet being readily eroded by sandblasting, the die-cut ply having a stencil pattern cut therethrough.

The stencil pattern which must be removed to form the stencil perforations can be removed at any time after it is cut. The process of this invention for preparing a sandblasting stencil includes removing the stencil pattern cut through the erosion-resistant ply to form the perforations either prior to applying the retaining sheet or subsequent to removing the backing sheet to expose the adhesive. The three-ply stencil of this invention can therefore include the erosion-resistant ply wherein the stencil pattern has been removed to form the perforations or can include the erosion-resistant ply wherein the stencil pattern material is retained in place between the hard backing sheet and the retaining sheet.

In the preferred embodiment of the three-ply stencil of the present invention the portions which are cut by the die and must be removed to form the stencil perforation are held in place between the backing sheet and the retaining sheet. These portions can be removed when the backing sheet is peeled off to expose the adhesive surface prior to applying to the hard surface to be sandblasted. The cut portions of the stencil are thus usefully retained within the three-ply stencil and will not be lost during storage or handling. This product is desirable because it retains these cut portions for later use if the surface is to be shape carved.

As explained above, during shape carving, the portions of the hard surface which were exposed through the stencil during the shape-carving sandblasting operation and contain the cutout indicia are recovered by the central portions of the stencil, the cutout portion of the stencil forming the outline of the design removed, and the outline of the design is then formed in the hard surface.

The method of this invention for sandblasting stone or other hard surfaces using the above three-ply stencil comprises removing the backing sheet to expose the adhesive layer, removing any portions of the stencil pattern remaining in the erosion-resistant ply to form the stencil perforations, bonding the stencil onto the hard surface to be sandblasted by the adhesive layer, and sandblasting the hard surface through the stencil perforations to form the desired indicia.

If desired, the hard surface can be shape-carved by stripping the central portions of the cutout design in the stencil sheet before applying to the hard surface, sandblasting the hard surface to shape carve the exposed portions of the hard surface, replacing and bonding the central stencil pattern pieces to conform to the shape-carved portion, removing the outline portions of the stencil, sandblasting to more deeply cut into the hard surface to form the outline of the design surrounding the previously shape-carved design.

The stencil applied to the hard surface to be sandblasted comprises the erosion-resistant stencil mask with the stencil pattern removed, which is directly applied to the hard surface by way of the adhesive layer, and the retaining sheet which is readily eroded by the sandblasting operation. Preferably, the retaining sheet is transparent, but if desired it can be translucent or opaque. The sandblast can be applied to the stencil and the retaining sheet is quickly eroded, exposing the cutout portions of the stencil.

During the sandblasting operation, the sandblasting tool is applied to the stone to cutout the desired design following the perforations in the stencil of the present invention. The upper retaining sheet is eroded, but the erosion-resistant sheet is not eroded by the sandblasting so that the stone is only cut in the portions exposed through the perforations.

Details of the invention are shown by reference to the accompanying drawings which illustrate preferred embodiments of the invention:

FIG. 1 is a view in perspective of the two-ply stencil blank used in the present invention showing the outline of indicia to be cut into the stencil ply to form a portion of a floral design.

FIG. 2 is a cross section of the two-ply stencil blank showing the indicia being cut into the stencil sheet by die-cutting apparatus.

FIG. 3 is an enlarged cross section of the stencil blank of FIG. 1 along the lines 3–3 after having a stencil pattern cut therein as shown in FIG. 2.

FIG. 4 is the same cross section as in FIG. 3 illustrating the three-ply stencil according to this invention where the stencil pattern has been removed prior to applying the retaining sheet.

FIG. 5 is a cross section as in FIG. 4 showing the three-ply product where the stencil pattern is retained in place.

FIG. 6 is a cross section of the stencil of FIGS. 4 or 5 after the backing sheet has been removed to expose the adhesive layer preparatory to applying to a stone surface.

FIG. 7 is a vertical cross section showing a stone being sandblasted using a stencil according to the invention.

In carrying out the process of this invention the steps shown in the drawings are carried out as follows:

The drawings illustrate various stages in carrying out the process of this invention as well as the three-ply stencil product of this invention.

A two-ply stencil material, shown in FIG. 1, is prepared from a backing sheet 19 which is not readily cut by a die, and a resilient erosion-resistant stencil ply 15. The two plies are joined by an adhesive layer 17.

As shown in FIG. 2, the next step, according to this method, is to cut a stencil pattern into the stencil sheet 15 without cutting through the backing sheet 19. The die-cutting edge 12 is preferably formed of a hard plastic material, such as is disclosed in copending application Ser. No. 649,496, filed June 28, 1967 now U.S. Pat. No. 3,469,488, issued Sept. 30, 1969. The die 10 is preferably of plastic and is also limited in its downward movement, as explained in the copending application, to prevent cutting or damaging the backing sheet 19.

The two-ply stencil is placed on a flat surface 35. The stencilling die 10 is placed over the stencil sheet 15 and pressed into sheet 15 by means of press block 37. To ensure accuracy in cutting, the die 10 is set in a frame 36. The downward cutting movement of the die can then suitably be limited by the overhang 33 on the bottom face of press block 37. This can be used to prevent the exertion of any cutting pressure against the backing sheet 19.

In FIG. 3, the floral pattern is shown as having been cut into the stencil ply 15. The stencil pattern 13 is intended to be removed from the stencil to form the desired perforation in the stencil. The backing sheet 19 and the adhesive layer 17 serve to prevent dislocation of the central portions of the flower indicated by the numeral 14 in the drawing, even after the outline portion 13 is removed.

There are two alternative subsequent steps in proceeding with the method of this invention following cutting the indicia in the stencil sheet 15, as shown in FIGS. 2 and 3: The stencil outline 13 can be removed and a retaining sheet 21 having a pressure-sensitive adhesive surface applied to the top face of the stencil sheet 15, as shown in FIG. 4.

Alternatively, as shown in FIG. 5, the top sheet 21 is applied before the stencil outline has been removed. Accordingly, FIGS. 4 and 5 represent two embodiments of the three-ply stencil sheet of this invention.

As explained above, it may be desirable to maintain the stencil outline 13 in the stencil ply, after cutting by the die, if the stencil is to be shipped or stored for any length of time, to avoid loss of the stencil pattern. If it is desired to shape carve stone, for example, the stencil outline 13 cannot be removed from the stencil sheet until after the area under the central cutout portions 14 has been shape carved, and portions 14 replaced, when the outline can be formed.

When the worker is ready to use the stencil for sandblasting a hard surface, the backing sheet is removed to expose the adhesive layer 17 of the stencil sheet 15, the desired cutout portions removed and the stencil sheet 15 applied to the hard surface B, by way of adhesive layer 17 as shown in FIGS. 6 and 7.

In FIG. 6, the masking sheet 15 is shown with the stencil pattern 13 removed to form the perforations of the outline and the backing sheet 19 removed to expose the adhesive layer 17. The central portion of the stencil perforations 14, which is not connected to the remaining portion of the mask 15, is held in place by the adhesive on the retaining sheet 21. There is no shape carving to be done in this case.

When the two-ply stencil of FIG. 6 is attached to a hard stone surface, by way of the exposed adhesive layer 17, as shown in FIG. 7, the stone is ready to be sandblasted to cutout the outline in the stone surface as shown by the dotted lines 22. The top sheet 21 is erodable by the sandblasting operation and thus need not be removed before sandblasting.

In a preferred embodiment of the process of this invention, care must be taken to properly balance the relative adhesive strengths of layer 17 to the backing sheet 19 and of the adhesive backing on retaining sheet 21 to the stencil sheet 15. The adhesion between the backing sheet 19 and the adhesive layer 17 should be less than the adhesion between the adhesive backed retaining sheet 21 and the stencil sheet 15. Otherwise, when the backing sheet 19 is removed, the central portion 14 of the cutout indicia might be displaced.

If the retaining sheet 21 were to be removed prior to sandblasting, which is not necessary when using the stencil of the present invention, the adhesive strength between adhesive layer 17, the rock B and the stencil ply 15 must be greater than the adhesive strength between the adhesive-backed top sheet 21 and the stencil ply 15. As this latter balance is more difficult to predetermine, it is an advantage to make the retaining sheet 21 of an erodable material which does not interfere with the sandblasting operation.

It is pointed out that once the stencil ply is applied to the stone surface B, the central portions 14 are anchored in place, not only by the retaining sheet 21, but also by the adhesive layer 17 attached to the stone surface B.

Where the stone surface is to be shape carved, before the outline of the design has been formed on the stone surface, by sandblasting using the stencil 15 as shown in FIG. 7, the central portion 14 is removed first, leaving the stencil outline 13 in place, and the central portion of the stone surface, which has been exposed by removing the portion of the stencil mask 14, is then shape carved so as to leave a textured pattern in the stone surface. The portion 14 is then replaced and the outline strips 13 removed, and the outline deeply blasted into the stone.

The stencil ply 15, e.g. as shown in the above drawings, is preferably formed of a relatively soft, resilient elastomeric material, such as uncured or partially cured rubber, which is soft enough to be readily cut by a die but is resilient enough to resist erosion by sandblasting. The term "rubber" includes both natural rubber and synthetic rubbers such as ABS and GRS rubber. These materials have a hardness rating on the Shore Durometer A scale, which is the softest of the hardness rating scales. Generally, these materials will have a hardness rating below about 80 (Shore A) (ASTM D–676) and preferably in the range from about 40 to 70 (Shore A).

Generally, the stencil material must be erosion-resistant to the usual type of particulate material used for sandblasting rock. These particulate materials include aluminum oxide and silicon oxide, such as carborundum sand or steel shot. There are many rubber compositions especially formulated for use as sandblasting stencil such as "Continental Sandblast Stencil" sold by Anchor Continental.

The backing sheet 19 is formed of a hard, flexible, nonelastomeric plastic material which is not as readily cut by the die used for cutting the soft stencil mask 15. This material should therefore be hard, rather than soft and resilient as the stencil mask 15, but should also be flexible. The preferred suitable, hard flexible plastic backing materials have a hardness which is measurable on the Shore D scale, (ASTM D–1484) which is a magnitude greater than the Shore A scale. Preferably these materials have a Shore D hardness of at least about 75.

Such material includes plastic films, such as the polyester film sold under the trademark Mylar, nylon film and regenerated cellulose.

When cutting out the indicia in the stencil during the process of this invention, it is preferable to use a plastic nonmetallic die such as is described in copending U.S. application Ser. No. 649,496 filed June 28, 1967 now U.S. Pat. No. 3,469,488, issued Sept. 30, 1969. Such a plastic die is especially useful as it will readily cut through the soft rubber stencil sheet 15 but is not hard enough to readily cut through the hard plastic backing sheet. A metal die of similar construction would be more likely to cut through such a sheet provided sufficient pressure were exerted, the plastic die would tend to deform rather than cut through the film in such a case.

The adhesive layer 17 must be a material which will adhere strongly to the stencil sheet 15 and to a stone surface to which it is attached, but which will not adhere strongly to the backing sheet 19. Generally a rubber cement would be useful regardless of the type of backing sheet used. Rubber cements are especially useful because they do not leave a residue on the stone surface which would have to be cleaned off.

The retaining sheet 21 is preferably a transparent, nonelastomeric, hard, flexible plastic film readily eroded by sandblasting. Materials which are useful for the backing sheet 19 are also useful for the retaining sheet 21. Commercial products which would be useful include pressure-sensitive tapes formed of polyester film and sold under the trademark "Silver Simlar" or of transparent regenerated cellulose, for example "Scotch" tape or "Paklon" tape.

The stencil sheet of the present invention can be cut in any intricate desired shape without fear of displacing an interior portion of the design. The central material outlining the perforations in the stencil sheet of this invention which are not linked to the rest of the stencil sheet, remain securely anchored in place by the adhesive layer 17 and backing sheet 19 and by the retaining sheet 21. The stencil sheet of the present invention is extremely useful when the stone is to be shape carved, because the parts that are removed by having been cutout by the stencil, i.e. the portion 14 in the drawings, can later be replaced over the shape-carved indicia portions of the stone surface. Having regard to the foregoing disclosure, the following is claimed as the inventive and patentable embodiments thereof:

I claim:

1. A three-ply stencil product for use in inscribing a hard surface by sandblasting comprising an intermediate erosion-resistant stencil ply having a hardness of not greater than about 80 Shore A and having a stencil pattern cut therethrough; an adhesive layer on a first face of the stencil ply to secure the stencil ply to the surface to be inscribed; a flexible plastic backing ply having a hardness of at least about 75 Shore D, resistant to being cut by a stencil cutting die, secured to the first face of the stencil ply by means of the adhesive layer; and an uncut, flexible sandblast-erodable plastic retaining ply having a hardness of at least about 75 Shore D bonded to the second face of the stencil ply by an adhesive coating.

2. The stencil product of claim 1 wherein the stencil pattern cut through the stencil ply is retained in place between the backing ply and the retaining ply.

3. The stencil product of claim 1 wherein the stencil ply is formed of a semicured rubber and the backing ply is formed of polyester film.

4. The stencil product of claim 1 wherein the adhesive layer is rubber cement.

5. The stencil product of claim 1 wherein the retaining ply has a pressure-sensitive adhesive coating which bonds the retaining ply to the second face of the stencil ply.

6. The stencil product of claim 1 wherein the stencil ply is formed of soft, uncured or partially cured rubber.

7. The stencil product of claim 1 wherein the retaining ply and the backing ply are formed from materials selected from the group consisting of polyester film, nylon film and regenerated cellulose film.

8. A three-ply stencil product according to claim 1, in which the stencil ply has a hardness in the range from about 40 to about 70.

9. A three-ply stencil product for use in inscribing a hard surface by sandblasting comprising an intermediate erosion-resistant stencil ply having a stencil pattern cut therethrough; an adhesive layer on a first face of the stencil ply to secure the stencil ply to the surface to be inscribed; a hard, flexible plastic backing ply, resistant to being cut by a stencil cutting die, secured to the first face of the stencil ply by means of the adhesive layer; and an uncut, flexible sandblast-erodable plastic retaining ply bonded to the second face of the stencil ply by an adhesive coating; said backing ply and retaining ply being formed from materials selected from the group consisting of polyester film, nylon film and regenerated cellulose film.